March 10, 1925.
W. RUPPERT
SCREW PRESS
Filed July 7, 1924
1,529,215
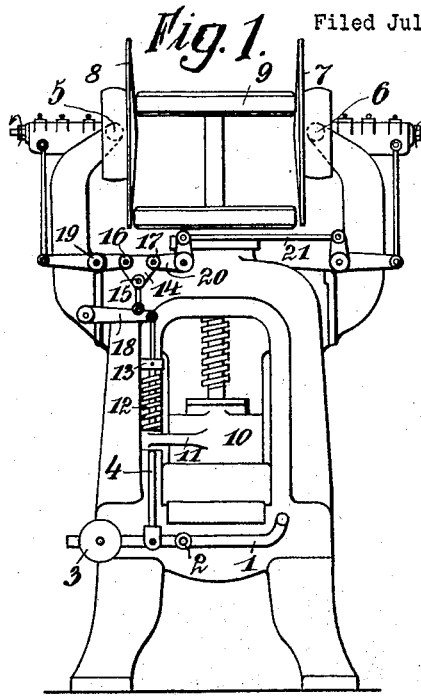
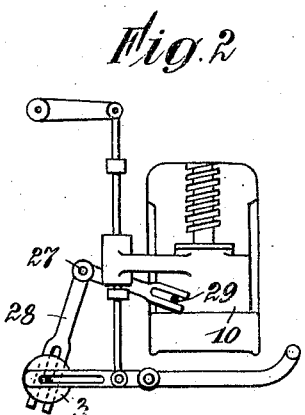
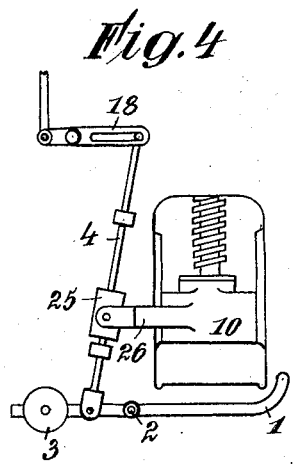
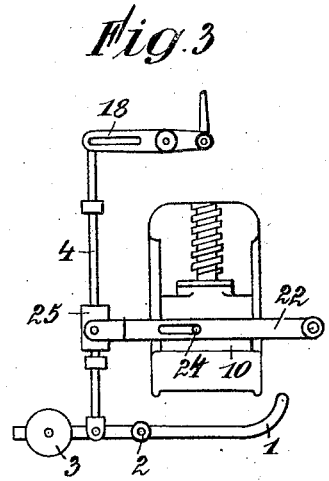
Inventor
W. Ruppert
by Langner, Parry, Card & Langner
Atty Patented Mar. 10, 1925.

1,529,215

UNITED STATES PATENT OFFICE.

WILHELM RUPPERT, OF VIENNA, AUSTRIA.

SCREW PRESS.

Application filed July 7, 1924. Serial No. 724,704.

*To all whom it may concern:*

Be it known that I, WILHELM RUPPERT, a citizen of the Republic of Austria, residing at Vienna, Austria, have invented certain new and useful Improvements in Screw Presses (for which I have filed applications in Austria July 4, 1923, Number A. 3,060—23, and Germany July 6, 1923, Number R. 58,878), of which the following is a specification.

In friction screw presses having driving friction discs adapted to rock around axes at right angles to their shafts and cooperating with two driven friction discs on the screw spindle, one of which is operative in the upward movement of the screw spindle while the other is operative in its downward movement, the arrangement is such that each driven friction disc engaging with the driven discs moves from the centres of the latter towards their peripheries, whereby the speed of the screw spindle and of the driven friction discs increases as they approach the ends of their up and down movements. Therefore on reversing the movement of the screw spindle at the upper end of its stroke a considerable quantity of kinetic energy has to be compensated for by friction and this causes a considerable expenditure of power and a rapid wear of the leathering of the friction discs besides objectionable irregularities in the operation of the press. Moreover when two driving friction discs are used, the pressures of the driving discs on the driven disc do not exactly counterbalance each other under such conditions and even one of the driving friction discs may become entirely inoperative in the downward movement of the spindle and the other in its upward movement. The required power is then not transmitted to the driven friction discs and the nut and screw spindle are rapidly worn.

The object of my invention is to obviate these inconveniences.

With this object in view my invention consists in providing means whereby the pressure between the driving and the driven friction discs is gradually reduced as the screw spindle moves upwards so that the driven friction disc slips on the driving one to the greater an extent the more the screw spindle approaches the upper end of its stroke and thus the speed of the driven disc can rise only to a moderate value; furthermore in case of screw presses having two driving discs opposite each other I provide means whereby the pressures of the opposite driving friction discs on the driven friction discs are equalized.

In the annexed drawing Fig. 1 shows by way of example a front elevation of an embodiment of my improved friction screw press. Figs. 2, 3 and 4 are similar views of modifications of the link and lever gearing connected with the ram for obtaining a variable transmission of pressure.

In the embodiment shown in Fig. 1 the two armed hand lever 1 pivoted at 2 in the frame of the press carries at one end a counter weight 3 tending to move downwards the controlling link 4 which is yieldingly connected by link and lever gearing to the driving friction discs 7 and 8 adapted to rock in opposite directions round pivot pins 5 and 6 at right angles to the common shaft of the discs 7 and 8 revolving in opposite directions. The arrangement is such that the driving friction discs 7 and 8 are forced against the upper driven friction disc 9 for screwing upwards the screw spindle on which the disc 9 is secured. When the screw spindle thus moves upwards an arm 11 secured to the ram 10 gradually compresses a spring 12 interposed between this arm and a shoulder 13 on the link 4 whereby the pressure exerted by the counter weight 3 is progressively counter acted. Thereby the pressure between the driving discs 7 and 8 and the driven disc 9 is progressively reduced and in consequence thereof the disc 9 is not revolved with its full speed, but slips the more on the driving discs, the more the screw spindle approaches the upper end of its stroke. Therefore when the press is reversed the kinetic energy of the driven disc is comparatively small and will be readily overcome during a short movement of the screw spindle.

The means provided for reducing the pressure between the driving discs 7 and 8 and the driven disc 9 consist in the embodiment shown in Fig. 1 of a connecting plate 14 pivotally connected to the controlling levers 18, 19 20 at 15, 16 and 17 respectively. By means of this connecting plate 14 the two driving discs 7 and 8 are reliably brought into contact with the driven friction discs 9 and 21 even if the driving discs were not exactly adjusted, the pressure between both driving discs 7 and 8 and the driven disc 9 or 21 being equalized.

In the embodiment shown in Fig. 2 the reduction of the pressure between the driving and the driven discs when the screw spindle approaches the upper end of its stroke is brought about in the following manner: When the ram 10 rises the counterweight 3 is moved towards the fulcrum of the hand lever 1 as shown in Fig. 2 to the right, by means of a bell crank lever 28 fulcrumed at 27 in the frame of the press and engaging by one of its bifurcated arms a pin 29 on the ram and by its other bifurcated arm the counterweight 3 slidably mounted on the hand lever 1.

In the embodiment shown in Fig. 3 a lever 22 is pivoted at 23 in the frame of the press, this lever is actuated by a pin 24 on the ram engaging into a slot thereof. The free end of the lever 22 is pivotally connected to a sleeve 25 guided on the link 4, which in turn engages by pin and slot connection with the controlling lever 18. Thus when the ram rises the link 4 is so turned round its pivot on the hand lever 1, as shown in Fig. 3 to the right that the operative length of the arm of the lever 18 connected to the said link 4 is the more reduced the more the screw spindle approaches the upper end of its stroke, whereby the pressure between the driving discs and the driven disc is reduced. By shortening the operative length of the arm of the lever 18 also the leverage of the reversing gear is advantageously changed as when the operative length of this arm is shorter, the movement of the ram 10 during the reversing is likewise shortened. The surplus rotation of the driven friction disc is therefore not only reduced by the reduction of its kinetic energy but also by the reduction of the movement required for reversing the press.

In the embodiment shown in Fig. 4 an arm 26 secured to the ram 10 engages with the link 4 and causes the outer end of this link to approach progressively the fulcrum of the controlling lever 18 as the screw spindle approaches the upper end of its stroke, otherwise the arrangement and the operation are the same as described with reference to Fig. 3.

Of course as the screw spindle approaches the lower end of its stroke the pressure between the driving discs 7 and 8 and the driven disc increases in all cases whereby the pressure or blow of the ram on the blank are increased.

I wish to be understood that I do not limit myself to the details of construction hereinbefore described as these may be varied within wide limits without departing from the essence of my invention.

What I claim is:

1. In a friction screw press in combination with a screw spindle carrying a ram, a pair of driven discs arranged to drive the screw spindle a pair of driving friction discs rotatable on a common axis in opposite directions, arranged on opposite sides of the driven discs, and adapted to engage therewith, means for rocking the driving discs on pivots at right angles to the common axis of the driving discs, means actuated by the screw spindle and actuating in turn the said means for rocking the driving discs, whereby the pressure between the driving discs and the driven discs is progressively increased and reduced as the screw spindle approaches the lower and upper end respectively of its stroke.

2. In a friction screw press, in combination with a screw spindle carrying a ram, a pair of driven friction discs secured to the screw spindle, a pair of driving friction discs rotatable on a common axis in opposite directions, arranged on opposite sides of the driven discs and adapted to engage therewith, and means for rocking the driving discs on pivots at right angles to the common axis of the driving discs, means actuated by the said screw spindle and actuating in turn the said means for rocking the driving discs, whereby the pressure between the driving discs and the driven discs is progressively increased and reduced as the screw spindle approaches the lower and upper end respectively of its stroke, the said means actuated by the screw spindle comprising, a lever, and a pin engaging with the lever and adapted to be shifted along the lever by the screw spindle.

3. In a friction screw press in combination with a screw spindle carrying a ram, a pair of driven friction discs secured to the spindle, a pair of driving friction discs rotatable on a common axis in opposite directions arranged on opposite sides of the driven discs and adapted to engage therewith, and means for rocking the driving discs on pivots at right angles to the common axis of the driving discs, means actuated by the said screw spindle and actuating in turn the said means for rocking the driving discs whereby the pressure between the driving discs and the driven discs is progressively increased and reduced as the screw spindle approaches the lower and upper end respectively of its stroke, such means actuated by the screw spindle comprising, driving disc levers for rocking the driving discs, a lever, a force exerting pin engaging therewith and adapted to be shifted along the lever by the screw spindle, and a link pivotally connected to the lever and to the driving disc levers for rocking both of the driving discs.

In testimony whereof I have signed my name to this specification.

WILHELM RUPPERT.

Witnesses:
 JOSEF GURMANN,
 M. REEBS.